United States Patent
Hovde

(10) Patent No.: US 12,428,112 B2
(45) Date of Patent: Sep. 30, 2025

(54) SYSTEM FOR AVOIDING DAMAGE TO POWER CABLES TO AND FROM AND WITHIN A FLOATING OFFSHORE WIND POWER PLANT

(71) Applicant: APL NORWAY AS, Kolbjørnsvik (NO)

(72) Inventor: Geir Olav Hovde, His (NO)

(73) Assignee: APL NORWAY AS, Kolbjørnsvik (NO)

( * ) Notice: Subject to any disclaimer, the term of this patent is extended or adjusted under 35 U.S.C. 154(b) by 473 days.

(21) Appl. No.: 17/927,971

(22) PCT Filed: May 25, 2021

(86) PCT No.: PCT/NO2021/050132
§ 371 (c)(1),
(2) Date: Nov. 28, 2022

(87) PCT Pub. No.: WO2021/242112
PCT Pub. Date: Dec. 2, 2021

(65) Prior Publication Data
US 2023/0219662 A1  Jul. 13, 2023

(30) Foreign Application Priority Data
May 29, 2020 (NO) .................................. 20200641

(51) Int. Cl.
*B63B 43/00* (2006.01)
*B63B 21/50* (2006.01)
(Continued)

(52) U.S. Cl.
CPC .............. *B63B 43/00* (2013.01); *B63B 21/50* (2013.01); *B63B 35/44* (2013.01); *F03D 13/25* (2016.05);
(Continued)

(58) Field of Classification Search
CPC ......... B63B 43/00; B63B 21/50; B63B 35/44; B63B 22/04; B63B 2035/4433;
(Continued)

(56) References Cited

U.S. PATENT DOCUMENTS

| 6,502,526 B1 | 1/2003 | Aarsnes et al. |
| 6,685,519 B1 | 2/2004 | Bech et al. |

(Continued)

FOREIGN PATENT DOCUMENTS

| CN | 102454553 A | 5/2012 |
| EP | 2789848 A1 | 10/2014 |

(Continued)

OTHER PUBLICATIONS

International Bureau, International Search Report in International Application No. PCT/NO2021/050132, mailed Aug. 5, 2021.

(Continued)

*Primary Examiner* — Eldon T Brockman
(74) *Attorney, Agent, or Firm* — Leydig, Voit & Mayer, Ltd.

(57) ABSTRACT

A system for preventing damage to a power cable for electric power transmission to and from and within a floating offshore wind power plant using non-redundant mooring, after failure of a main loadbearing mooring element is described, comprising at least one power cable safety line having the following properties: It is connected to the same two wind turbines as the power cable it is designed to protect. It has an effective length shorter than the power cable it is designed to protect. It has an effective length longer than what is needed to remain largely unstressed when the distance between the floating wind turbines with intact mooring systems is at its maximum. It has a breaking (Continued)

strength being a predetermined fraction of the strength, which the main loadbearing mooring elements are designed for.

6 Claims, 13 Drawing Sheets

(51) Int. Cl.
    *B63B 35/44*     (2006.01)
    *F03D 13/25*     (2016.01)
    *H01B 7/282*     (2006.01)
    *H02G 9/02*     (2006.01)
    *B63B 21/00*     (2006.01)

(52) U.S. Cl.
    CPC ............... *H01B 7/282* (2013.01); *H02G 9/02* (2013.01); *B63B 2021/003* (2013.01); *B63B 2035/446* (2013.01)

(58) Field of Classification Search
    CPC ......... B63B 22/02; F03D 13/25; F03D 9/255; F03D 9/257; F05B 2240/85; F05B 2240/95; F05B 2240/93
    See application file for complete search history.

(56) References Cited

U.S. PATENT DOCUMENTS

| | | | | |
|---|---|---|---|---|
| 8,641,324 B2* | 2/2014 | Quash | ..................... | B63B 27/24 |
| | | | | 405/168.1 |
| 10,421,524 B2* | 9/2019 | Cermelli | ................. | B63B 22/04 |
| 10,858,075 B2* | 12/2020 | Cermelli | ................. | B63B 1/107 |
| 11,939,032 B2* | 3/2024 | Boo | ........................ | B63B 1/107 |
| 2009/0288612 A1* | 11/2009 | Himmelstrup | .......... | B63B 21/50 |
| | | | | 114/230.1 |
| 2011/0305518 A1 | 12/2011 | Pearce et al. | | |
| 2017/0218919 A1 | 8/2017 | Wong | | |
| 2020/0124029 A1 | 4/2020 | Wagner | | |
| 2020/0284235 A1* | 9/2020 | Moffat | .................... | F03B 13/18 |

FOREIGN PATENT DOCUMENTS

| | | | |
|---|---|---|---|
| EP | 3 212 496 | A2 | 9/2017 |
| EP | 3 212 496 | B1 | 10/2019 |
| JP | 2014-93902 | A | 5/2014 |
| JP | 2017-521597 | A | 8/2017 |
| WO | WO 2005/108200 | A1 | 11/2005 |
| WO | WO 2015/189580 | A1 | 12/2015 |
| WO | WO 2016/069636 | A2 | 5/2016 |
| WO | WO 2016/083509 | A1 | 6/2016 |
| WO | WO 2018/175297 | A1 | 9/2018 |

OTHER PUBLICATIONS

International Bureau, Written Opinion of the International Searching Authority in International Application No. PCT/NO2021/050132, mailed Aug. 5, 2021.
NIPO, Norwegian Search Report in Norwegian Application No. 20200641, dated Dec. 30, 2020.
European Patent Office, extended European Search Report in counterpart European Application No. 21 81 4204, dated May 6, 2024.
Japanese Patent Office, Japanese Office Action issued in the corresponding Japanese Patent Application No. 2022 to 564350, dated Jun. 24, 2025.

* cited by examiner

― Movement region of anchor line

---- Movement region of safety line

▨ Resulting movement region of wind turbine

SYSTEM FOR AVOIDING DAMAGE TO POWER CABLES TO AND FROM AND WITHIN A FLOATING OFFSHORE WIND POWER PLANT

CROSS-REFERENCE TO RELATED APPLICATIONS

This patent application is the U.S. National Stage of International Patent Application No. PCT/NO2021/050132, filed May 25, 2021, which claims the benefit of Norwegian Patent Application No. 20200641, filed May 29, 2020, which are each incorporated by reference.

TECHNICAL FIELD

The present invention relates to a system of one or several passive structural safety lines to avoid over-stressing of at least one of the electrical power cables to and from and within a floating offshore wind power plant after failure in the main mooring system holding the floating wind turbines in position, and where the safety lines are oriented parallel or nearly parallel to the concerned power cable or the broken mooring line, and where the safety line has marginal influence to the behavior of the floating wind turbines when all the main mooring lines are intact.

BACKGROUND

A non-redundant mooring system, in which a mooring line failure will cause a significant change in the position of the floating wind turbine, is a common consideration for a floating offshore wind turbine or for power plants comprising several floating offshore wind turbines. This is because such mooring systems with very few mooring lines, typically 3 three mooring lines per floating wind turbine, will reduce the cost of the development.

Note that losing one out for three mooring lines may, in the industry, be defined as a redundant mooring system if the loss of position of the floating wind turbine does not lead to any potential collision with other structures or floating wind turbines. However, herein a mooring system where a single failure leads to a significant loss of position, irrespective of the risk for collision with other structures or floating wind turbines, is defined as a non-redundant mooring system. Failure in systems with more than three mooring lines may potentially also significantly change the position, and if this loss of position implies failure in other parts, such as the power cable, then also these mooring systems are considered as non-redundant in this text.

Some floating wind turbines have a split mooring line bridle arrangement towards the floating structure, i.e. each mooring line is connected to one anchor, or another main connection, but has two connections to the floating structure. Such a mooring line arrangement is herein defined as one mooring line, and not two mooring lines.

Main drawback with a non-redundant mooring system is that if a mooring line fails then the large dispositioning of the floating wind turbine most likely will cause over-stressing and thus failure of the power cables connected to the floating wind turbine with the broken mooring line. Failure of one or several power cables due to failure in the mooring system will then add significant repair cost and downtime in the power production compared to only repairing the failed mooring line. The invention therefore relates to an arrangement of passive safety lines that restricts the floating wind turbine from moving more than the maximum allowable distance for keeping the power cable within its capacity limits A passive arrangement is here defined as an arrangement where no active adjustment of the arrangement by e.g. winches, or similar, are done immediately prior to, during, or immediately after failure of the main mooring system. Occasional or regular line length adjustments to compensate for load-dependent and time-dependent, such as creep, permanent elongation in synthetic ropes, is not considered as active adjustments of the lines, but instead considered as part of a maintenance program of a passive system.

Related prior art is disclosed in WO2016083509A1, which relates to a system for avoiding collision between two floating structures with a back-up mooring line arrangement. However, this system requires an active tensioning means on the floating structure that tightens up the back-up mooring line in case of malfunctioning of the main mooring system. Other related prior arts that show arrangements restricting, in these cases fluid lines with hydrocarbons, from over-stressing are disclosed in US6502526B1, US6685519 B1, WO2005108200A1 and WO2015189580A1. However, in all these prior art publications the lines restricting the fluid lines from overstressing are also main load bearing arrangements, and not only back-up lines or passive safety lines. Document WO 2018/175297 A1 discloses a system for preventing damage to power cables for electric power transmission between seabed and a floating offshore wave power plant and/or within the wave power plant comprising a plurality of wave energy converters using non-redundant mooring and traditional (main) loadbearing mooring elements. WO 2018/175297 A1 does not prevent damage to a power cable for electric power transmission between seabed and a floating after failure of a main loadbearing mooring element. Document EP 3212496 B1 discloses a floating offshore wind power plant where the wind turbines are connected to mooring lines to ensure station keeping with power cables for electric power transmission between seabed and the floating offshore wind power plant. Document EP 3212496 B1 does not teach how to prevent damage to a power cable.

In the offshore oil and gas industry a common practice for transferring fluid, e.g. stabilized oil, between a floating storage unit and an export tanker is via a tandem offloading arrangement. Three typical tandem offloading arrangements are illustrated in FIG. 11a, FIG. 11b and FIG. 11c, respectively. FIG. 11a shows an arrangement between a turret-moored floating storage unit 25 and a standard export tanker 27. The fluid is in this arrangement transferred via a floating fluid line/hose 22 and the export tanker is moored to the floating storage unit via a mooring hawser 24. To avoid slack in the mooring hawser, and thereby avoid a risk for collision between the tanker and the floating storage unit, a tug 28 pulls on the export tanker via a tug line 29 connected to the other end of the tanker compared to the mooring hawser. FIG. 11b shows a similar arrangement, but from a spread-moored storage unit 26. In both these arrangements the mooring hawser, which is also to protect the fluid line to be overstressed, is a main loadbearing element, and not a back-up structural component. Further, the tandem offloading system contains emergency-release features in case of failures. In FIG. 11c the export tanker is equipped with a dynamic positioning system that keeps the export tanker at a certain distance to the storage unit, implying that the mooring hawser is not a necessity, but prevents failure in the fluid line 23 in case of failure in the dynamic positioning system leading to a larger distance between the export tanker and the production unit. This system does also have emergency release features for the hawser and fluid line. The latter arrangement has some similarities to the invention, but it relates to transfer of fluid between ship-shaped units, and to an arrangement where the export tanker is dynamically positioned, instead of passively moored. The tandem offloading systems also relates to systems where the separation distance between the export tanker and the storage unit is typically 80-150 m, i.e. much closer than the distance between two floating wind turbines.

The main objective of the present invention is to avoid damage to the power cable and its accessories due to failure in one of the main mooring elements in the mooring system of a floating wind turbine. 'Failure in one of the main mooring elements' is to be understood as loss of restoring force from one of the anchors and anchor lines. Avoidance of damage to the power cable will also lead to more time for rectification of the failed mooring system since the station keeping ability of the floating wind turbine is maintained. To achieve these objectives a system according to claim 1 is provided.

SHORT SUMMARY OF THE INVENTION

The invention describes a system for preventing damage to a power cable for electric power transmission between seabed and a floating offshore wind power plant and/or within the wind power plant comprising a plurality of wind turbines using nonredundant mooring, after failure of a main loadbearing mooring element. The system comprises at least one power cable safety line having the following properties: The power cable safety line is connected to the same two wind turbines as the power cable it is designed to protect, it is having an effective length shorter than the power cable it is designed to protect also when exposed to axial forces up to the breaking strength of the power cable safety line, it is having an effective length longer than what is needed to remain largely unstressed when the distance between the floating wind turbines with intact mooring systems is at its maximum, and it is having a breaking strength being a predetermined fraction of the strength, which the main loadbearing mooring elements of the mooring is designed for. The system may further comprise at least one seabed power cable safety line having the following properties: The seabed power cable safety line is connected to the floating wind turbine from which a power cable exits or enters the wind power plant to or from the seabed, it is anchored to existing or separate anchor points on the seabed, it is not interfering with any normal movements of any existing mooring lines, it has a significant restoring force component in the same direction as the seabed power cable, it has an effective length longer than what is needed to remain largely unstressed independent of the position of the wind turbine when all main loadbearing mooring elements are intact, and it has an effective length short enough to restrict the possible movements of the windmill, when one of the main loadbearing mooring elements fails, together with the remaining main loadbearing mooring elements, such that the at least one seabed power cable safety line takes the mooring loads instead of the power cable.

BRIEF DESCRIPTION OF THE FIGURES

Below, various embodiments of the invention will be described with reference to the figures, in which like numerals in different figures describes the same features.

FIG. 1b shows a side view of the same floating wind turbine as in FIG. 1a.

FIG. 2b shows a bird perspective of the same wind farm as in FIG. 2a.

FIG. 3b shows a side view of the same wind farm as in FIG. 3a.

FIG. 3c shows a bird perspective of the same wind farm as in FIG. 3a.

FIG. 6b is a bird perspective of the arrangement in FIG. 6a.

FIG. 6c is a side view of the arrangement in FIG. 6a.

DETAILED DESCRIPTION OF THE INVENTION

Figure 1A:
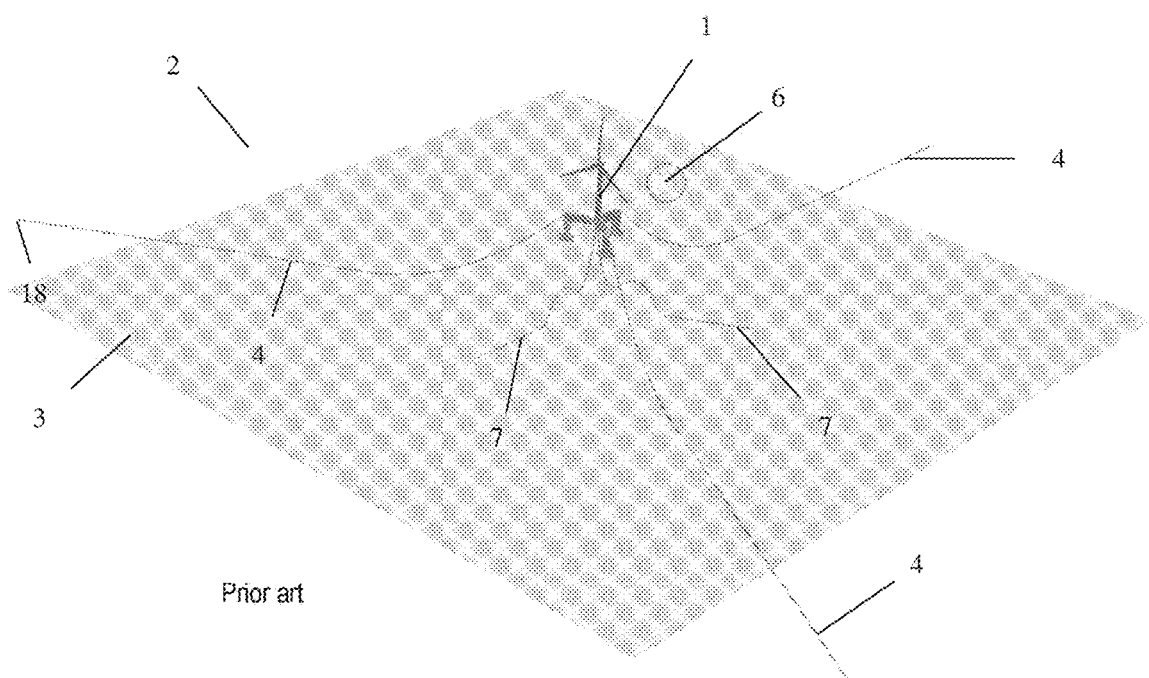
FIG. 1a shows a bird perspective view of a typical floating wind turbine with three mooring lines and two power cables in shallow water.

This invention relates to an arrangement or system for preventing failure in a power cable 5 between wind turbines or a seabed power cable 7 between the seabed 3 a wind turbine 1 floating on the sea surface 2 due to failure in the main mooring system of the floating wind turbine, where the main mooring system of the floating wind turbine typically comprises a set of mooring lines 4,8,9,10 connected directly to anchors 18 on the seabed 3 or indirectly via connections 11,12. The wind turbine is part of a wind power plant at sea comprising a plurality of wind turbines.

The system according to the invention comprises a set of power cable safety lines 13, which in a normal operating state, i.e. when the main mooring system is intact, are slack and subject to only negligible or marginal portion of the mooring design loads of the floating wind turbine. The power cable safety lines 13 will normally be located between floating wind turbines in an offshore wind power plant. Each power cable safety line is arranged with an orientation with reference to the horizontal plane and direction with reference to the vertical plane and an overall length with associated hang-off positions for the line ends such that when the safety lines are fully stretched out the concerned power cable 5, 7 is still maintaining its structural integrity, i.e. is not over-stressed. These power cable safety lines will typically comprise one or several components such as chain segments, steel wire rope segments, synthetic rope segments, buoys, weight elements and other connection elements.

Figure 9A:
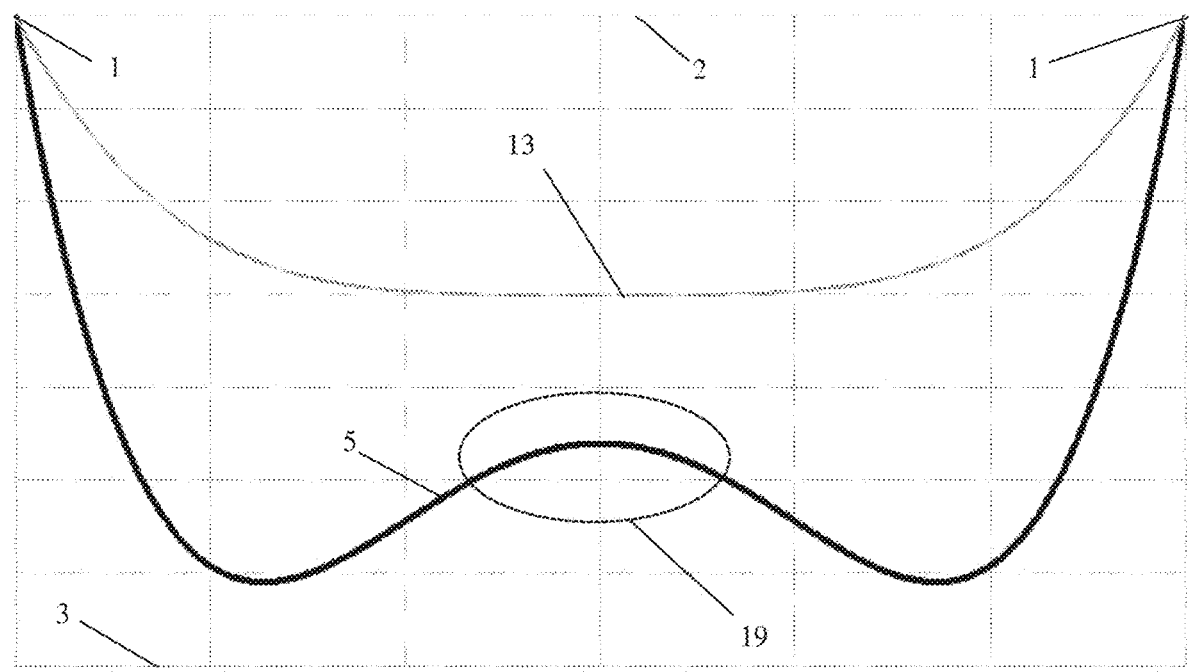
FIG. 9a shows an arrangement with a power cable and a parallel power cable safety line which are not connected to each other at any point, and where the power cable is not in contact with the seabed.
Figure 9B:
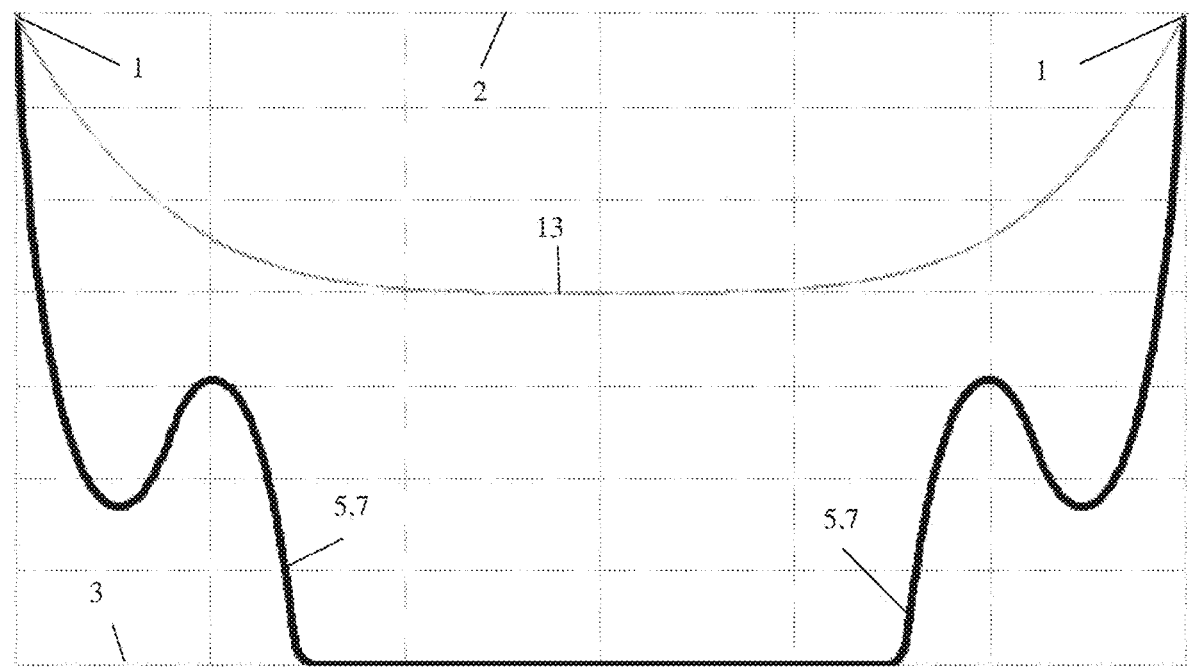
FIG. 9b shows an arrangement with a power cable and a parallel power cable safety line which are not connected to each other at any point, and where the power cable is in contact with the seabed.
Figure 10:
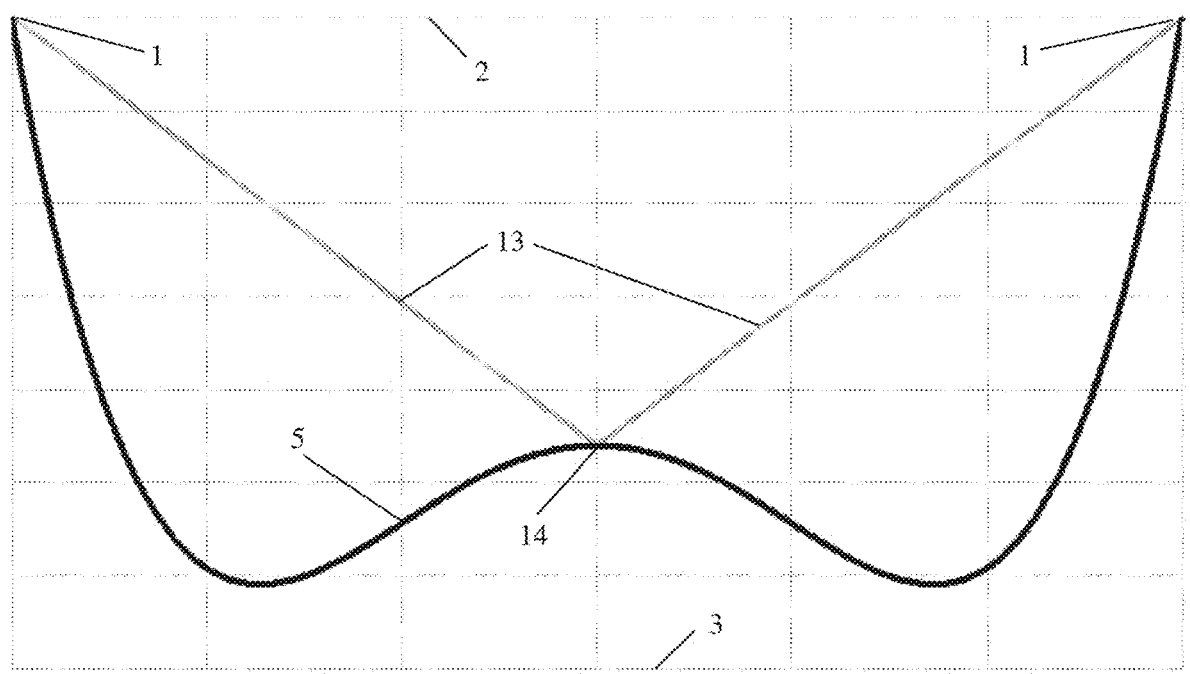
FIG. 10 shows an arrangement with a power cable and a parallel power cable safety line which are connected to each other at mid-length, and where the power cable is not in contact with the seabed.
Figure 11A:
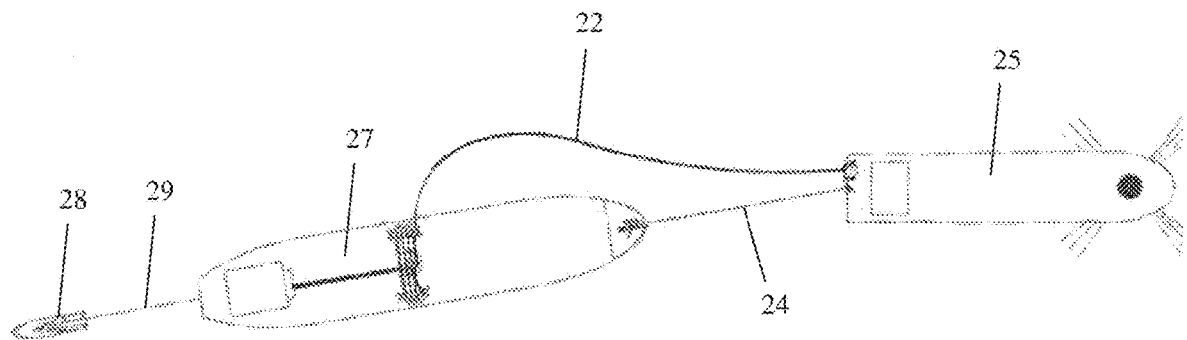
FIG. 11a shows an example of tandem offloading between a turret moored floating unit and an export tanker using a floating fluid line for transfer of fluid.
Figure 11B:
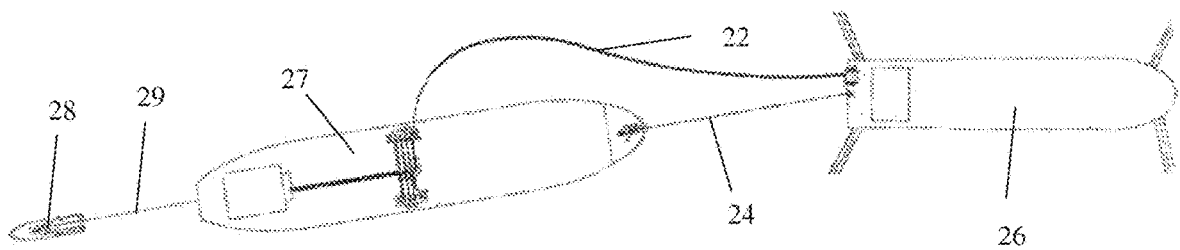
FIG. 11b shows same as FIG. 11a, but for a spread moored floating unit.
Figure 11C:
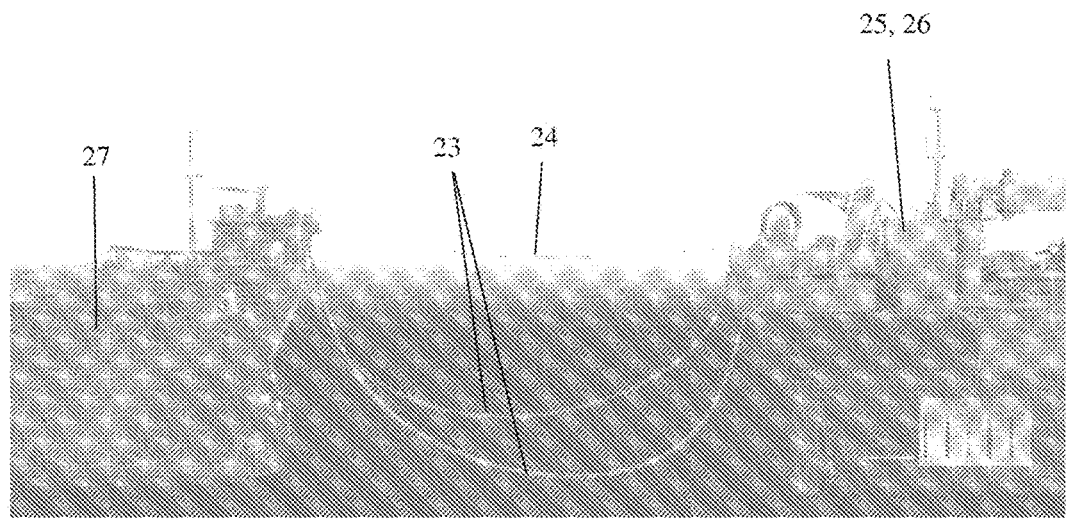
FIG. 11c shows an example of tandem offloading between a floating unit and an export tanker on dynamic positioning using a submerged fluid line for transfer of fluid.

To prevent over-stressing of a power cable 5 between two floating wind turbines, the power cable safety line 13 will typically be connected to the same two floating wind turbines without any fixation to the seabed with an anchor. FIGS. 9a, 9b and 10 illustrate the principles of a power cable safety line between two floating wind turbines. The safety line will then be oriented parallel or nearly parallel to the power cable, and typically be located higher in the water column than the power cable. An effective length of the safety line 13 shorter than the effective length of the power cable 5 will limit the maximum distance between the two floating wind turbines without over-stressing the power cable. By 'effective length' we mean the lengths that emerge when lengths from the center points of the wind turbines and the connection point of the respective power cable safety line and power cable are added to their respective lengths. In other words, we must take the shape of the wind turbine and the positioning of its connection points into account. Note that the axial stiffness of the safety line is an important parameter that will affect the effective length when subject to an axial load. The power cable safety line must still be shorter than the power cable when subjected to axial forces up to a magnitude of the breaking force of the power cable safety line. The minimum length of the safety line should on the other hand be long enough to avoid a highly stretched safety line when the distance between the floating wind turbines with intact mooring systems is at its maximum. It is further expected that the minimum required breaking strength of the safety line will be in the order of 35-70% of the minimum required breaking strength for the mooring lines in the main mooring system.

To prevent over-stressing of a seabed power cable 7 between a floating wind turbine and the seabed, the safety line 17 will be connected to the floating wind turbine at one end and to the seabed at the other end, where the seabed connection is either to the anchor 18 of the mooring line 4,8,10 closest to the seabed power cable or to a separate anchor positioned in the vicinity of the main mooring line anchor. Ideally the safety line should have an orientation between the orientation of the mooring line 4, 9 closest to the seabed power cable and the orientation of the seabed power cable itself. For all practical purposes this means the orientation of the safety line will be between parallel in same orientation (0 degrees) and up to typically 60 degrees, but no more than up to transverse direction (90 degrees), relative to the seabed power cable orientation; where 180 degrees mean parallel in opposite orientation relative the seabed power cable orientation. We could also say that a significant component of the restoring force of the seabed power cable safety line 17 must be in the same direction as the seabed power cable. The maximum effective length including effects of axial stiffness and orientation of the safety line 17 are determined by the maximum allowable displacement of the floating wind turbine without over-stressing the seabed power cable. The minimum length of the safety line should on the other hand be long enough to avoid a highly stretched seabed power cable safety line when the displacement of the floating wind turbine with intact mooring system is at its maximum. As above, it is expected that the minimum required breaking strength of the safety line will be in the order of 35-70% of the minimum required breaking strength for the mooring lines in the main mooring system.

Figure 12A:
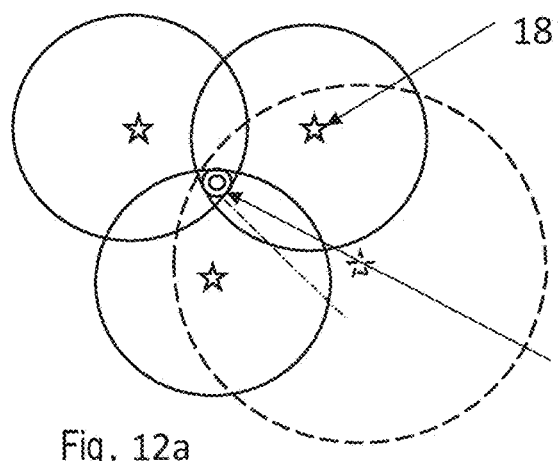
FIGS. 12a, 12b, 12c and 12d illustrate the different possible movement regions that occurs when main mooring elements fail with and without the presence of a seabed power cable safety line.
Figure 12B:
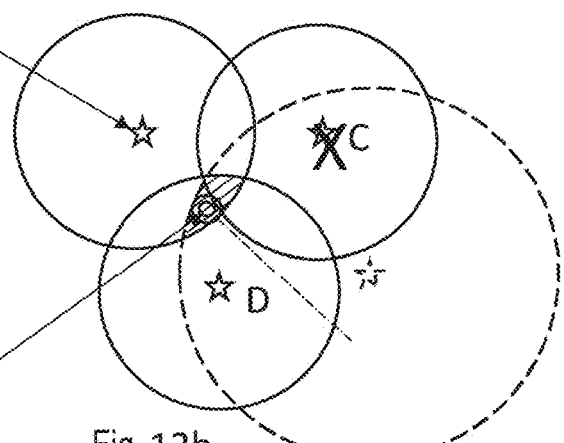
Figure 12C:
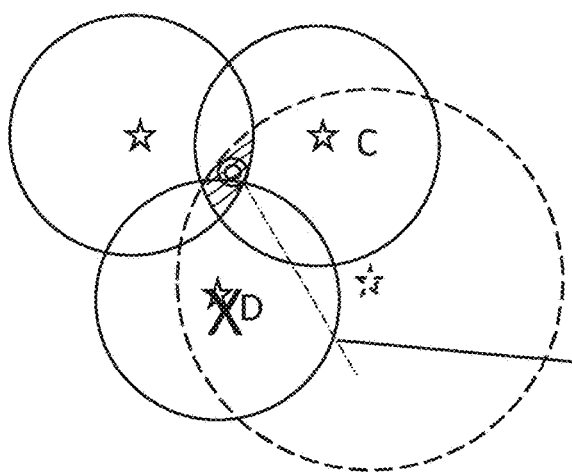
Figure 12D:
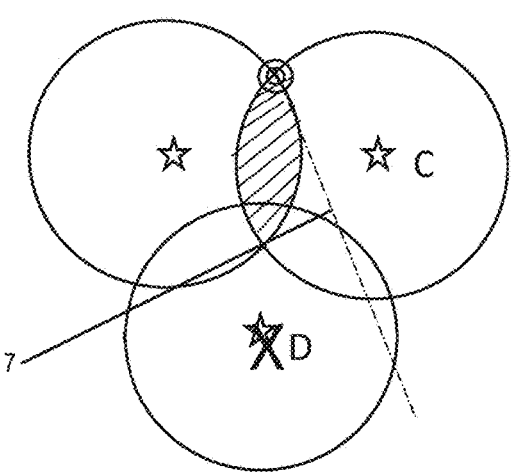

FIG. 12a illustrates possible movements of the wind turbine with all anchor lines intact. FIG. 12b and FIG. 12c show possible movements of the wind turbine when a seabed power cable safety line is provided and one of the respective mooring elements C and D fails. The 'X' indicates which of the main mooring elements has failed. FIG. 12d shows the possible movements of the wind turbine when no seabed power cable safety line 17 is provided. It is possible to argue that one simply could provide a much longer power cable, but in practical life a power cable cannot be dragged several hundred meters on the seabed without a risk for entanglement with e.g. obstacles on the ocean floor and thereby getting damaged. It is therefore preferable to restrict the movements of the wind turbine and instead provide a shorter seabed power cable, which has a length long enough to reach all the areas the wind turbine can reach when one of the main loadbearing mooring elements fails and the at least one seabed power cable safety line restricts the possible movements of the windmill together with the remaining mooring lines. This is illustrated in FIGS. 12a-12d. A main loadbearing element is defined as the anchor 18, the mooring line components of different sorts 4, 8, 9, 10, 11 or 12, and fixtures connecting them. All main loadbearing elements connected to a specific wind turbine constitutes the main mooring system of the specific wind turbine.

In one embodiment two seabed power cable safety lines 17 are provided. A significant component of the combined restoring force from the two seabed power cable safety lines 17 must then be in the same direction as the power cable. It is also conceivable with more than two seabed power cable safety cables.

Although the illustrations show a three-leg type semi-submersible as the floating wind turbine the invention relates to any type of floating wind turbines with any type of hull form. The invention also relates to any water depths and any mooring systems and power cable systems, where the benefits of the invention would be obvious for a person skilled in the art. The main mooring system of the floating wind turbine may be either a spread-moored system as shown in the illustrations herein, or a turret-moored system.

Figure 1B:
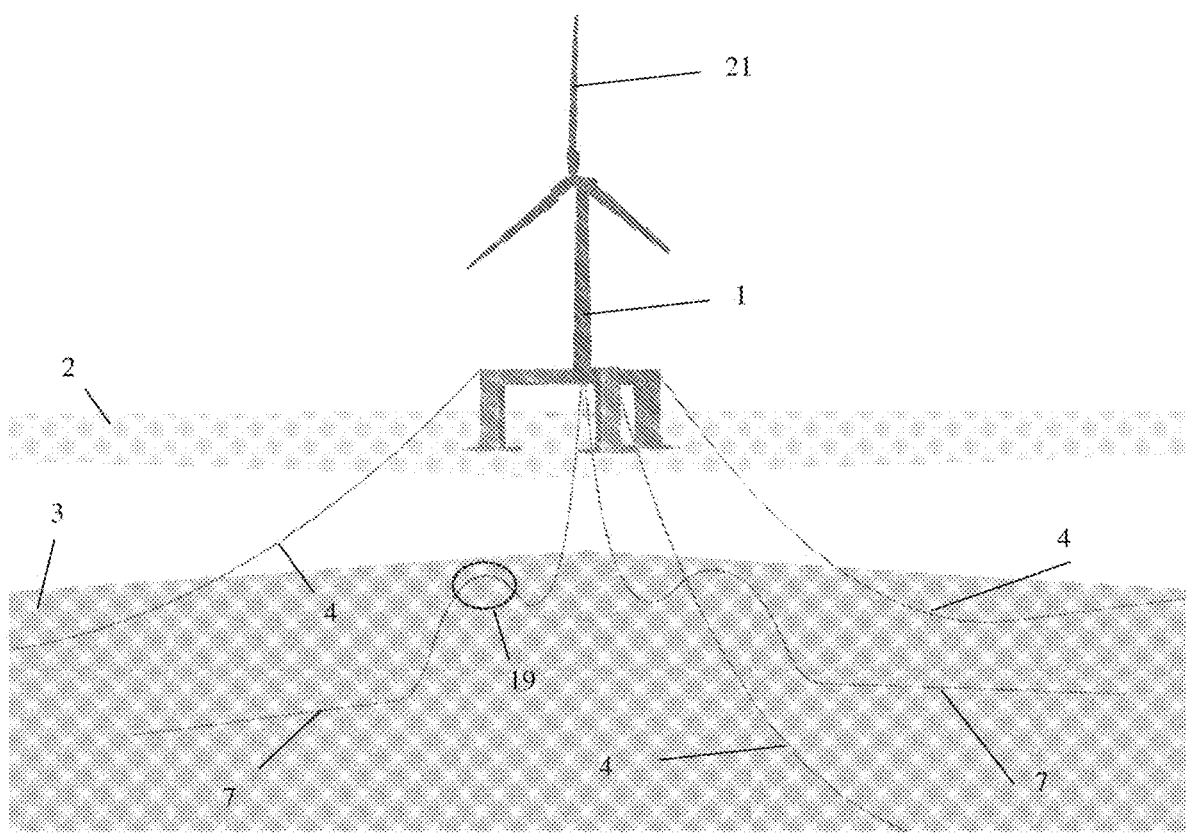

FIG. 1a gives an overall view of a single floating wind turbine 1 moored to the seabed 3 by three mooring lines 4 via anchors 18. The anchors can be of any type, where the most common types being driven pile, suction anchor, drag embedment anchor. The mooring lines 4 may comprise a combination of chain segments, steel wire rope segments, synthetic rope segments, buoys, weight elements and associated connections. The illustration also shows two power cables 7, which are connected to the floating wind turbine at a position above, at or below the sea surface 2 at one end, and to the seabed 3 at the other end. The power cables are shown with a lazy-wave dynamic configuration obtained by attaching buoyancy elements over a section of the cable length. The purpose of the dynamic configuration, which can be arranged in many ways, is to obtain flexibility without getting over-stressed due to motions and displacements of the floating wind turbine. If one of the mooring lines 4 in this arrangement, which does not contain any safety lines 17, breaks, then the floating wind turbine is not able to maintain its position. Instead it will move horizontally more than the displacement capacity built into the dynamic power cable configuration. FIG. 1b shows the same as FIG. 1a, but from a different view angle.

Figure 2A:
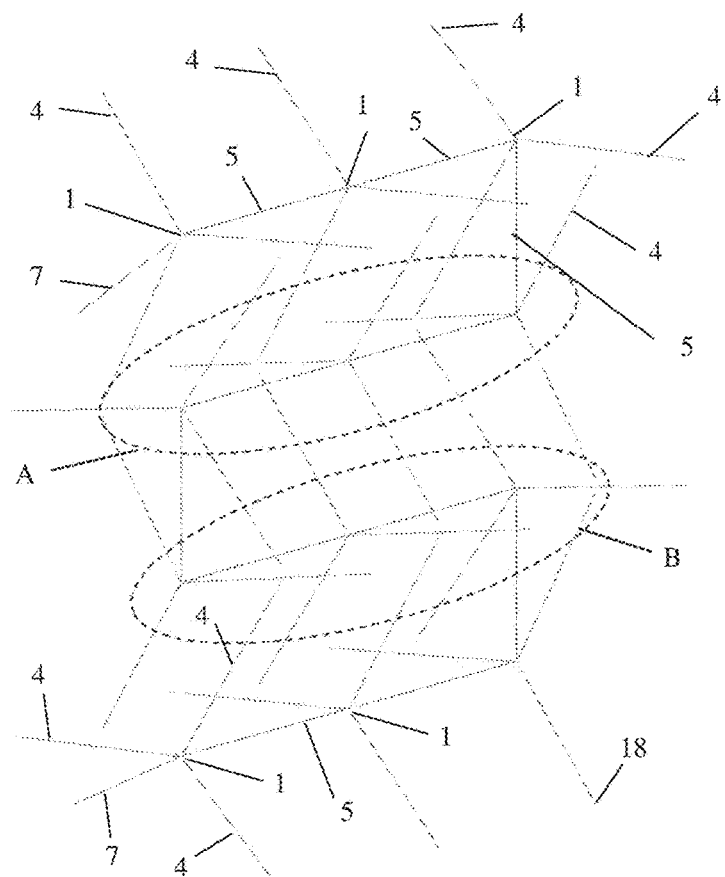
FIG. 2a shows a top view of a wind farm in deep water comprising twelve floating wind turbines, each with three individual mooring lines to the seabed and power cables between the turbines.
Figure 2B:
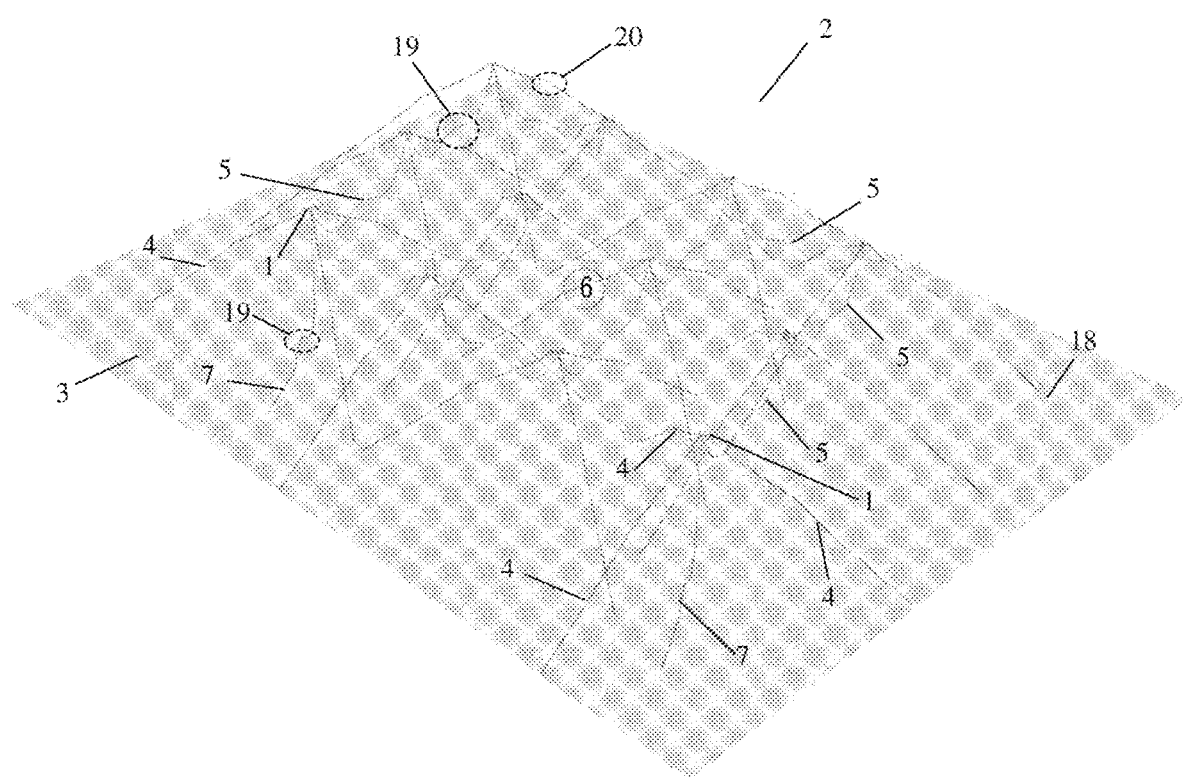

FIG. 2a and FIG. 2b show an example of a power plant with twelve floating wind turbines 1, each with individual mooring lines 4. The composition of the mooring lines between the anchor 18 and the floating wind turbine 1 is typically a combination of one or several items such as chain segments, steel wire rope segments, polyester rope segments, buoys 20, weight elements and various types of connections. FIG. 2a shows the wind power plant seen from above, while FIG. 2b shows the power plant from a bird-view. The illustrations represent a typical deep-water application, where the power cables 5 between the floating wind turbines are at all times kept in the water column without getting in contact with the seabed 3. These power cables are exemplified with a w-configuration obtained by distributed buoyancy elements 19 over a section of the cable. Further, the power cables 7 from the first and last floating wind turbine in the illustrated sequence of twelve floating units are configured as lazywaves, i.e. same configuration as the cables shown in FIG. 1a and FIG. 1b, but other types of configurations may also be possible, such as free-hanging catenary, steepwave, steep-s, lazy-s and clamped wave. In the illustrated mooring arrangement, the mooring systems for the different units are oriented such that the distance between the floating wind turbines are minimized with minimal amount of crossing mooring lines, which is done by orienting the mooring systems in opposite direction for two neighbor rows of floating wind turbines, confer A and B in FIG. 2a. How this best can be arranged depends however on the water depth and the minimum required distance between the floating wind turbines, which is typically taken as 5-8 times the diameter of the rotor 21. Power cable safety lines are not shown in FIG. 2a and FIG. 2b. To avoid confusion, we mention that the circle marked with the reference 6 in FIG. 2b and some of the other drawings represents the 'view rotation point' in the plotting software.

Figure 3A:
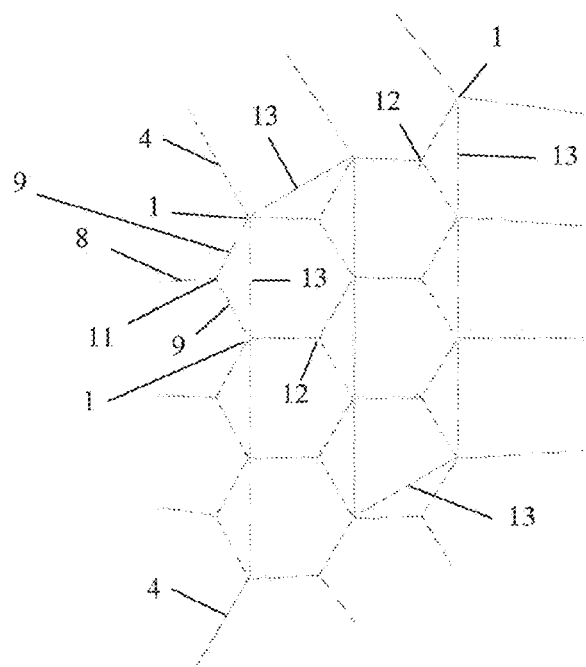
FIG. 3a shows a top view of a wind farm in deep water comprising twelve floating wind turbines with interconnected mooring lines and power cables between the turbines.
Figure 3B:
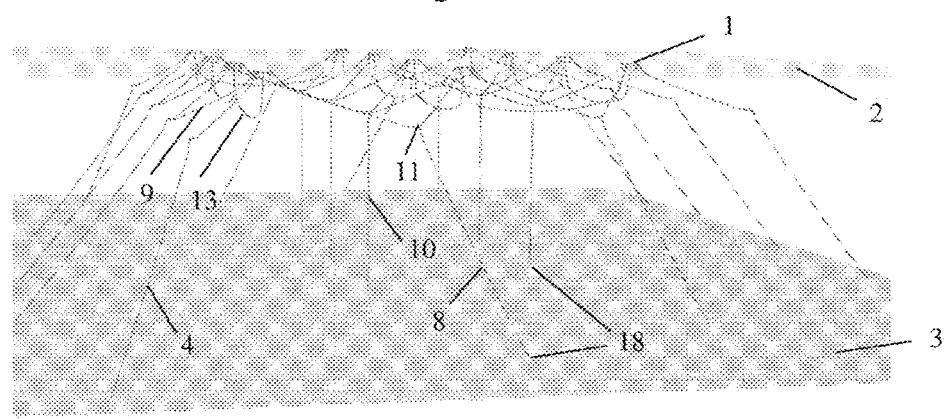
Figure 3C:
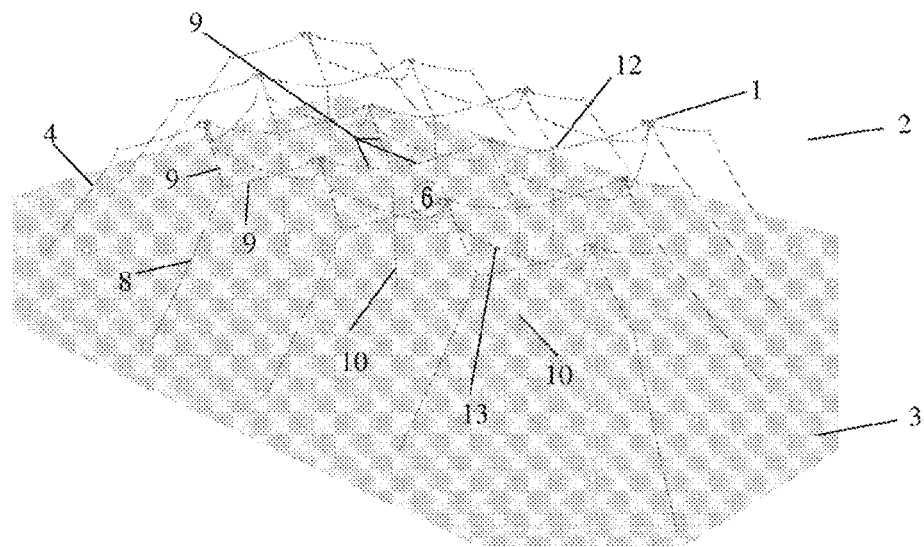

FIG. 3a, FIG. 3b and FIG. 3c show another example of a deep-water power plant, also exemplified with twelve floating wind turbines 1, but in this arrangement the floating wind turbines share some of the mooring lines and anchors. Floating wind turbines at the corners of the plant has one individual mooring line 4 to an anchor 18 on the seabed 3, and two mooring lines 9 attached to shared connections 11 with other floating wind turbines, where the connection 11 is further connected to an anchor 18 on the seabed via a mooring line 8. Floating wind turbines on the edge, but not at the corners, have two mooring lines 9 attached to shared connections 11 with other floating wind turbines, where the connection 11 is further connected to an anchor 18 on the seabed via a mooring line 8. The third mooring line 9 is attached to a shared connection 12 with two other floating wind turbines, which is further connected to an anchor 18 on the seabed via a mooring line 10. Floating wind turbines in the middle have three mooring lines 9 attached to shared connections 12 with other floating wind turbines, where the connection 12 is further connected to an anchor 18 on the seabed via a mooring line 10. The connections 11,12 can be designed with buoyancy to carry a portion of the weight or the entire weight of mooring lines 8,10. It will then be possible during the offshore installation phase to keep the lines partly or fully off the seabed also before the lines 9 and the floating wind turbines are connected. In the illustrated arrangement the power cable safety lines 13 between the floating wind turbines are shown. These safety lines will typically comprise one or several items such as chain segments, steel wire rope segments, polyester rope segments, buoys, weight elements and various types of connections. In normal operation when the main mooring system of the floating wind turbines are intact, the safety lines 13 will only be subject to marginal loads, since they will never be significantly stretched out, and they will then only marginally affect the behavior of the floating wind turbines. This slack configuration of the safety lines also implies a significant advantage for their installation since offshore handling will mainly be limited to handling the weight of the components themselves without significant connection loads during makeup of the last connection. The power cables are not shown in FIGS. 3a, 3b and 3c.

Figure 4:
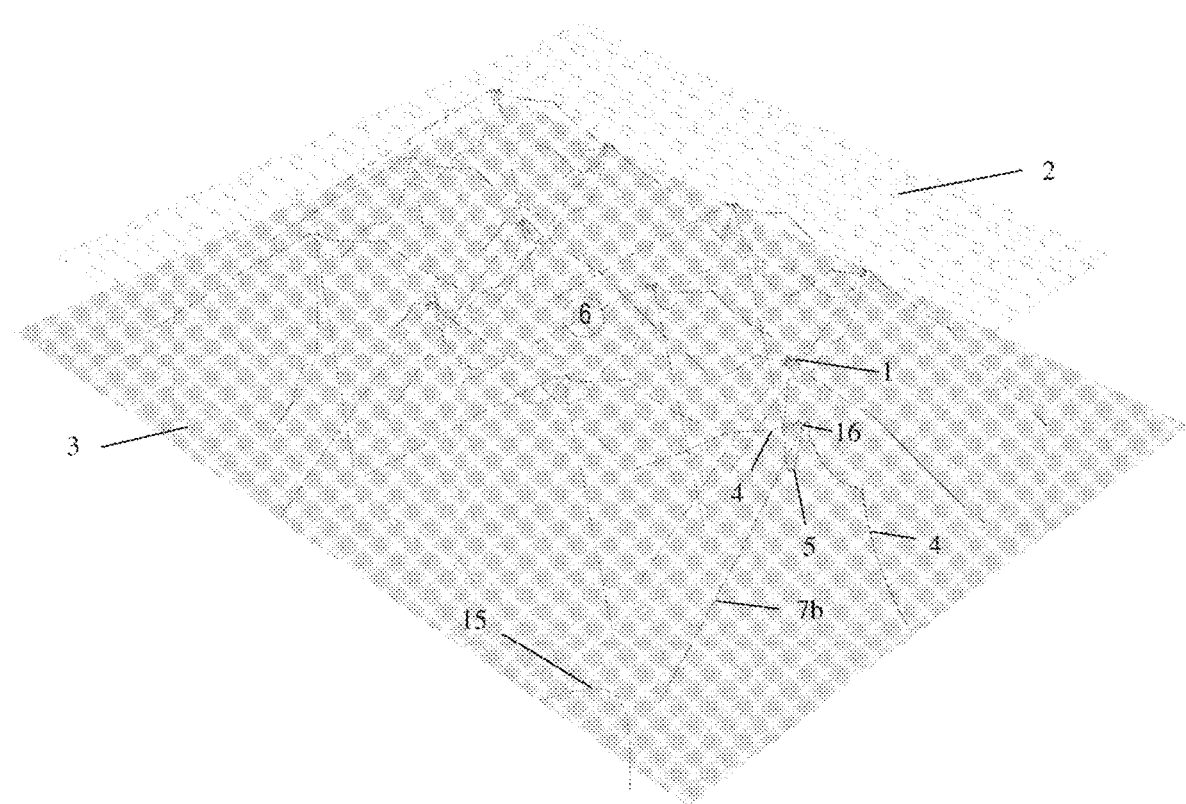
FIG. 4 shows a scenario with one broken mooring line in one of the wind turbines in FIG. 2.

FIG. 4 is the same as FIG. 2b, but with one of the mooring lines for one of the floating wind turbines broken, such that one of the power cables 7 to the seabed gets affected. The broken mooring line 15 leads to a significant displacement of the associated floating wind turbine 16, which then causes the power cable 7b to stretch to a level that most likely leads to failure of the cable.

Figure 5A:
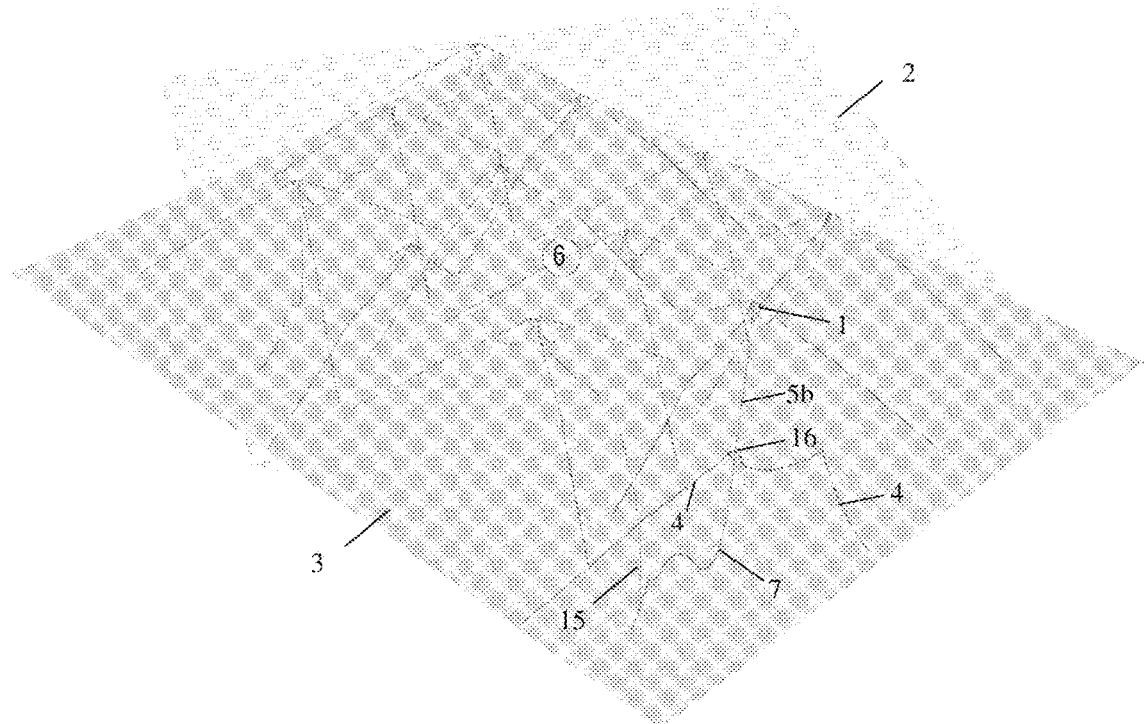
FIG. 5a is similar as FIG. 4, but with another line broken.
Figure 5B:
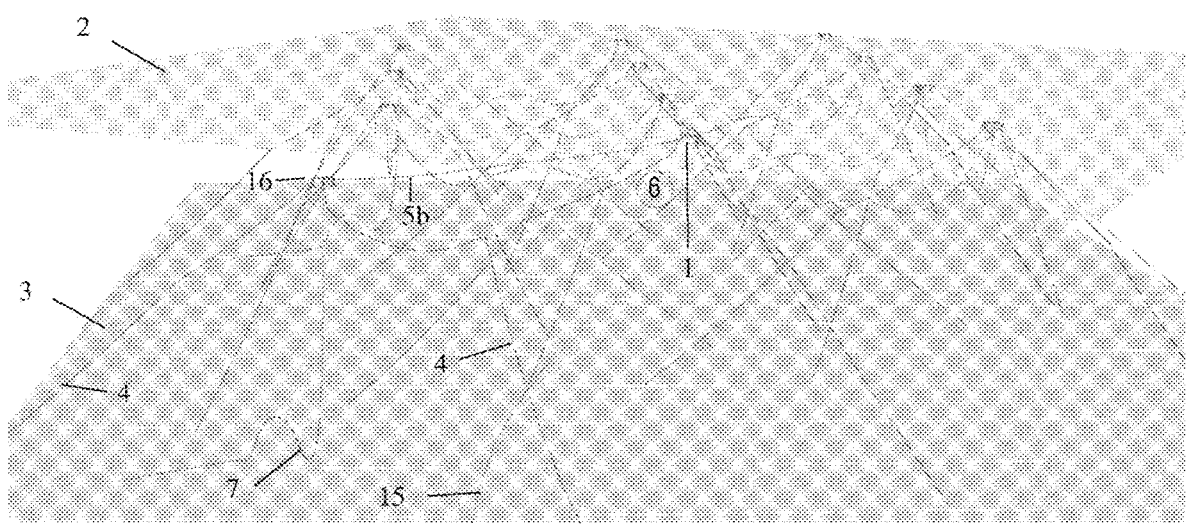
FIG. 5b is same as FIG. 5a, but with a different view angle.

FIG. 5a is the same as FIG. 2b, but with one of the mooring lines for one of the floating wind turbines broken, such that one of the power cables 5 between two floating wind turbines gets affected. The broken mooring line 15 leads to a significant displacement of the associated floating wind turbine 16, which then causes the power cable 5b to stretch to a level that most likely leads to failure of the cable. FIG. 5b shows the same as FIG. 5a, but from a different view angle.

FIG. 6a, FIG. 6b, FIG. 6c and FIG. 6d show the same floating power plant as in FIG. 2a and FIG. 2b, except that power cable safety lines 13 have been added between the floating wind turbines 1 in a direction parallel to or nearly parallel to the power cables 5. Seabed power cable safety lines 17 have also been added between the floating wind turbines and the seabed 3 for protecting the power cables 7 between the floating wind turbines and the seabed. The power cable safety lines 17 between the floating wind turbines 1 and the seabed 3 are in this example assumed to be oriented and directed parallel or nearly parallel to the mooring lines 4 closest to the power cables 7, and with shared anchors 18 with the mooring lines 4. The effective length of the safety line 17 is in this embodiment slightly longer than the mooring line 4 such that it can be installed with less forces than the mooring line, as well as getting exposed to smaller loads than the intact mooring line. The safety line 17 can also be oriented and directed to a separate anchor at either side of the mooring line 4, but the length and axial stiffness should be such that during normal condition it does not significantly affect the behavior of the main mooring system, and in case of a mooring line failure the floating wind turbine should not get a displacement larger than the working limits of the power cable.

Figure 6A:
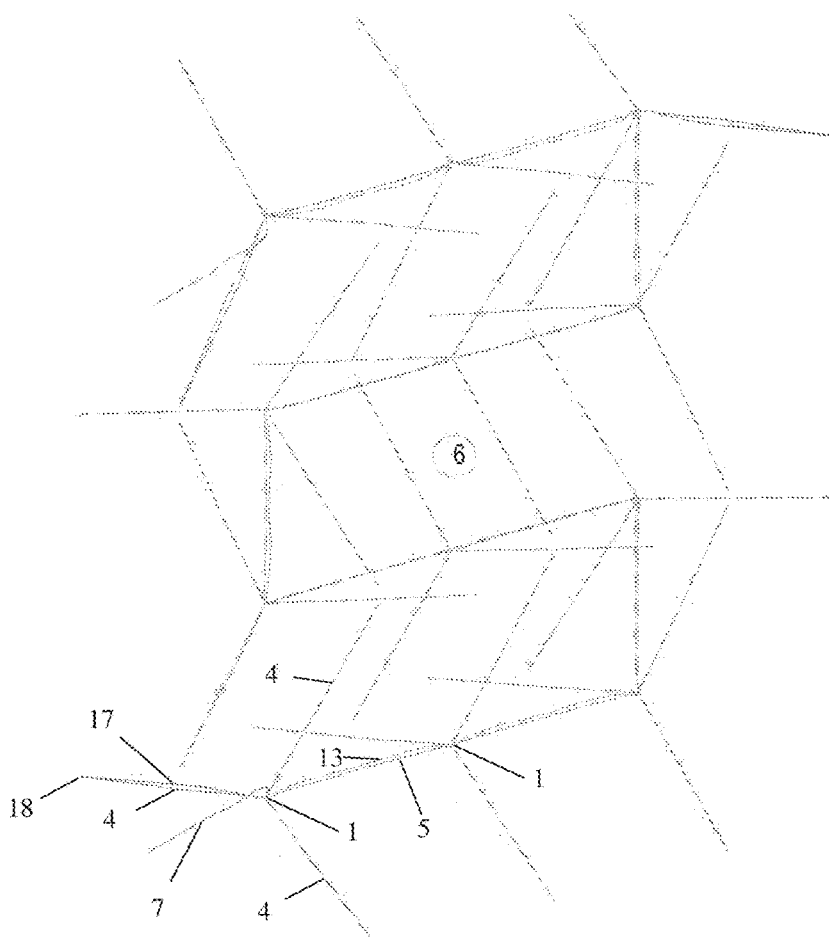
FIG. 6a is top view of the same wind farm arrangement as in FIG. 2, except that power cable safety lines are attached to avoid excessive loading in the power cables in case of mooring line failures.
Figure 6B:
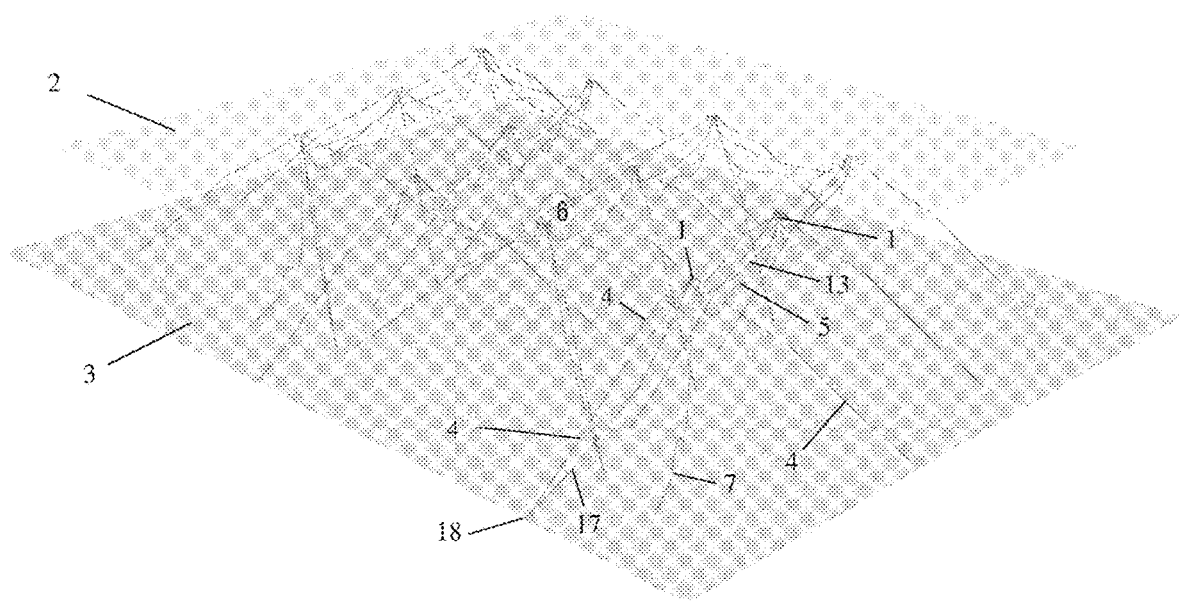
Figure 6C:
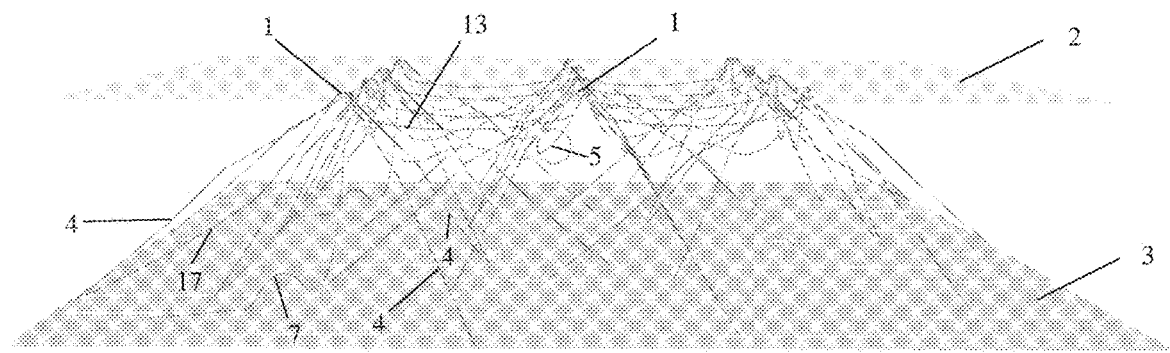
Figure 6D:
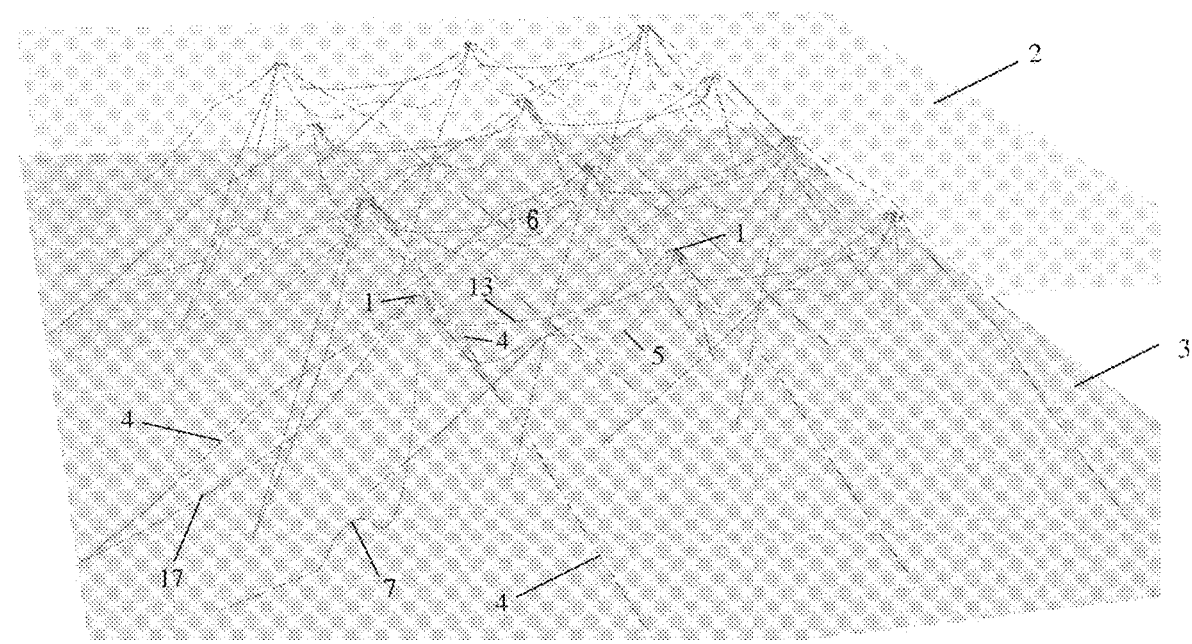
FIG. 6d is same as FIG. 6b, but from a different view angle.
Figure 7:
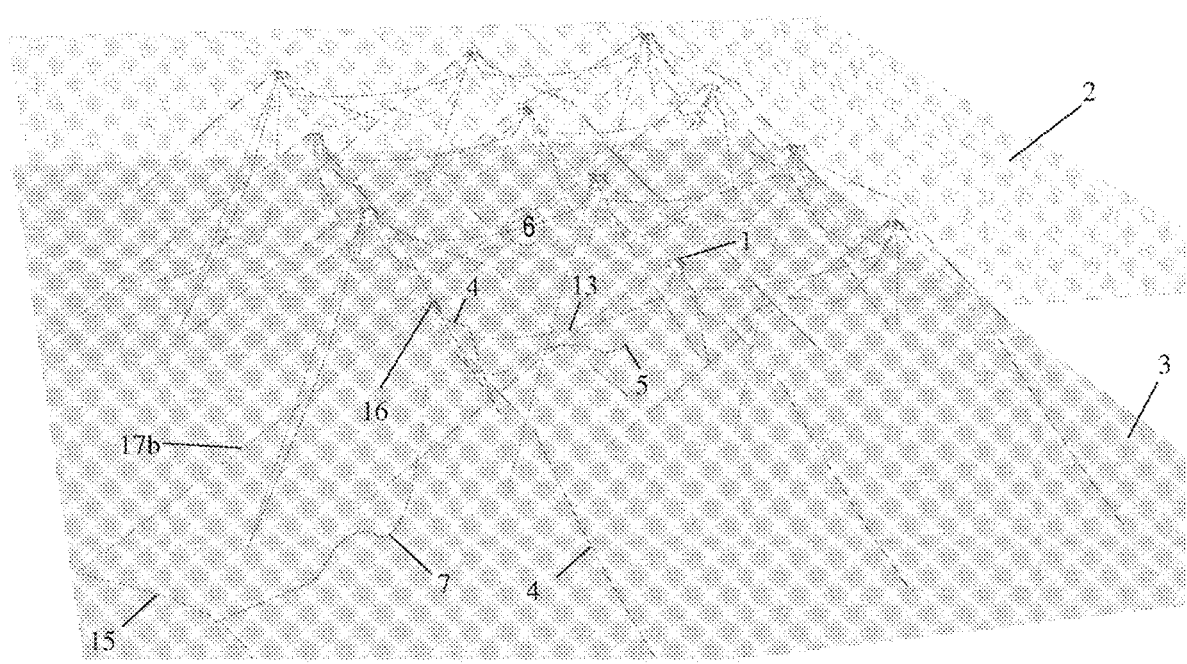
FIG. 7 is same as FIG. 4, but for the arrangement in FIG. 6 where power cable safety lines are introduced.
Figure 8A:
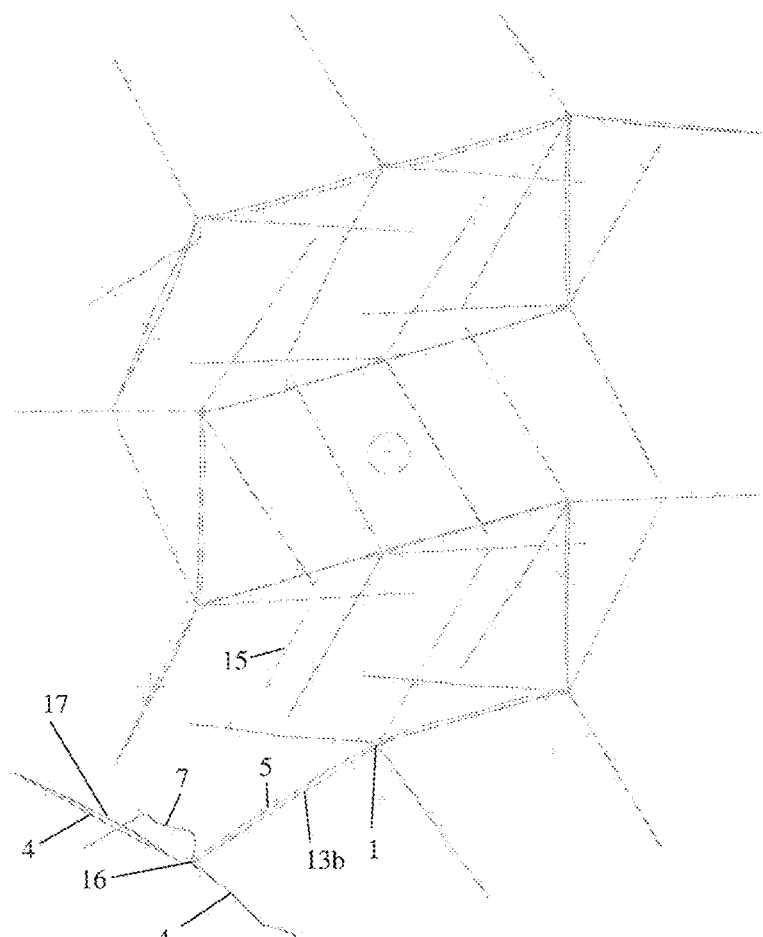
FIG. 8a is a top view of the same broken line scenario as in FIG. 5a, but for the arrangement in FIG. 6 where power cable safety lines are introduced.
Figure 8B:
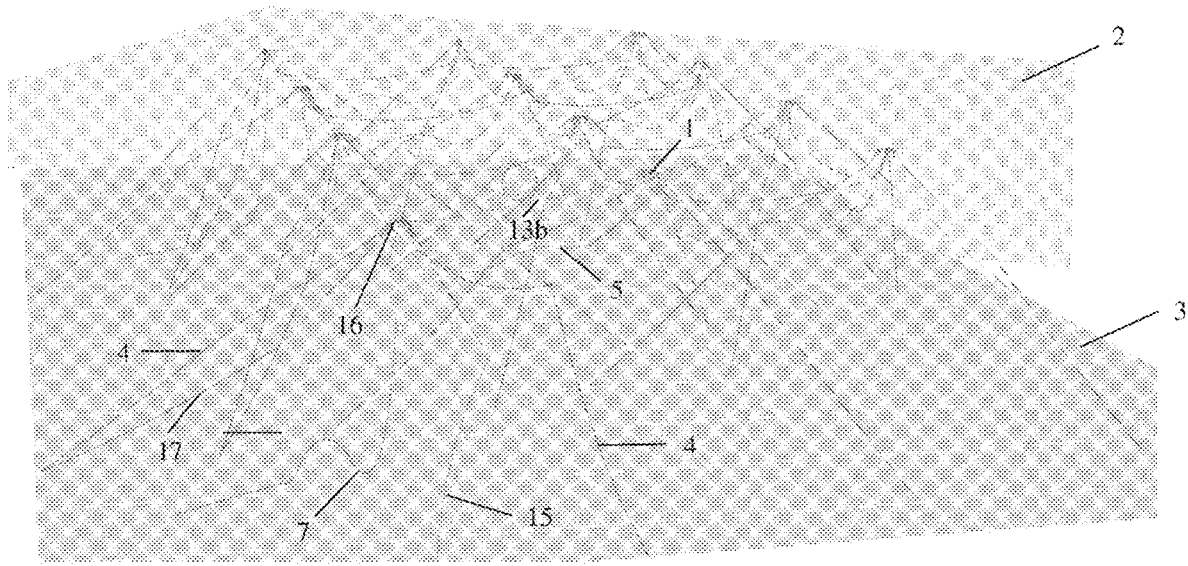
FIG. 8b is a view of the same broken line scenario as in FIG. 5b, but from a different view angle.

FIG. 7 is the same as FIG. 6d, but with a broken mooring line 15. The broken mooring line was in its intact stage parallel to the seabed power cable safety line 17. After breakage the safety line takes over as the mooring line, and thereby limits the displacement of the floating wind turbine 16 such that the power cable 7 stays within its working limits FIG. 8a and FIG. 8b show the same failure scenario as FIGS. 5a and 5b, but in this illustration a power cable safety line 13b is running parallel to the power cable 5 between the two floating wind turbines 1,16. The broken mooring line 15 of the associated floating wind turbine 16 leads to an increased distance between the floating wind turbines that stretches the power cable configuration 5, but due to the presence of the safety line 13b the power cable does not get stressed beyond its capacity.

FIG. 9a shows a typical arrangement for a power cable 5 at deep water between two floating wind turbines 1, where the power cable is not in contact with the seabed 3. The power cable 5 may be arranged with or without buoyancy 19. The power cable safety line 13 is running in parallel or close to parallel with the power cable. Both the power cable and the power cable safety line are hung-off on the same floating wind turbines, but preferably with some horizontal separation. Horizontal separation for hang-off locations may however not be necessary if the vertical separation of the power cable and the safety lines sufficiently avoid critical interference/contact between the two along their entire lengths. Further, vertical separation between the power cable and the safety line may not be necessary if the horizontal separation sufficiently avoid critical interference/contact between the two along their entire lengths. FIG. 9b shows a similar arrangement, but typically for a water depth where the power cable is partly in contact with the seabed.

FIG. 10 shows another embodiment of FIG. 9a, where the power cable safety line 13 is connected to the power cable 5 at one or several intermediate points 14. In this arrangement the power cable safety lines can be used to keep the power cable higher in the water column without adding buoyancy 19 to the power cable, and the power cable safety line can potentially be hung-off closer to the hang-off positions of the power cables on the floating wind turbines. A lighter composition of the safety lines can also be obtained since the weight of the power cable will keep the safety line in a lightly stretched mode, and thereby avoid or reduce the dynamic behavior of the safety line due to motions of the wind turbines and hydrodynamic loads from waves and currents.

In the normal operating state, i.e. when the main mooring system of the floating wind turbine is intact, the power cable safety line is at a safe distance below the sea surface 2 from any surface going vessels, except close to the floating wind turbines when the hang-off positions of the safety line on the floating wind turbines is above sea level. The general safe distance below sea surface is easily achievable as these lines are only lightly tensioned in this state. After a failure in the main mooring system the safety line, especially the safety line between two floating units will raise in the water, and potentially get dry when it gets tensioned due to lack of station-keeping ability in the main mooring system. This is a potential hazard for any vessels located above these lines at the time of failure, but this risk can be reduced by restricting the potential traffic of vessels above the safety lines.

The invention relates to floating wind power plants comprising of at least two floating wind turbines, and where the center-to-center distance between floating wind turbines connected to the same power cable is at least 500 m, implying that the overall length of the safety lines will be in the order of 500 m or longer. For arrangements where one or several safety lines 13, 17 are used to protect one or several power cables between two wind turbines or between a floating wind turbine and the seabed or between a floating wind turbine and another body (fixed or floating) the invention applies if the overall length of the safety line is at least 200 m. The overall length of the safety line refers to the length including all its individual components; each safety lines may comprise any combination of components such as chain segments, steel wire rope segments, synthetic rope segments, buoys, weight elements, other connection elements, etc.

Although specific embodiments of the invention have been described and illustrated herein, it is recognized that modifications and variations may readily occur to those skilled in the art, and consequently, it is intended that the claims be interpreted to cover such modifications and equivalents.

REFERENCE NUMERALS

1 Floating wind turbine
2 Sea surface
3 Seabed
4 Mooring line to seabed from floating wind turbine
5 Power cable between floating wind turbines
5b Same as 5, but refers to stretched cable caused by failure in mooring
6 A circle representing the 'view rotation point' in the plotting software
7 Power cable from floating wind turbine to seabed
7b Same as 7, but refers to stretched cable caused by failure in mooring system
8 Mooring line to seabed from intermediate Y-connection
9 Mooring line from floating wind turbine to intermediate connection
10 Vertical mooring line to seabed from intermediate clustered connection
11 Intermediate mooring line Y-connection
12 Intermediate mooring line clustered connection
13 Power cable safety line (between floating wind turbines)
13b Same as 13, but refers to stretched line caused by failure in mooring system
14 Intermediate connection point of power cable safety line to power cable
15 Broken mooring line
16 Floating wind turbine with broken line
17 Seabed power cable safety line (from floating wind turbine to seabed)
17b Same as 17, but refers to stretched line caused by failure in mooring system
18 Anchor
19 Section of power cable with distributed buoyancy
20 Buoy in mooring system/line
21 Rotor of wind turbine, which usually comprises three blades
22 Floating fluid line/hose
23 Submerged fluid line/hose
24 Mooring hawser
25 Floating unit moored to seabed by turret mooring; weather vaning unit
26 Floating unit moored to seabed by spread mooring; unit with fixed heading
27 Export tanker
28 Tug
29 Tug line

The invention claimed is:

1. A system for preventing damage to a power cable for electric power transmission between seabed and a floating offshore wind power plant and/or within the floating offshore wind power plant comprising a plurality of floating wind turbines using non-redundant mooring, after failure of a main loadbearing mooring element, the system comprising at least one power cable safety line having the following properties:

connected to two floating wind turbines and the power cable the at least one power cable safety line is designed to protect, having an effective length shorter than the power cable the at least one power cable safety line is designed to protect also when exposed to axial forces up to breaking strength of the at least one power cable safety line, having an effective length longer than what is needed to remain largely unstressed when a distance between the plurality of floating wind turbines with intact mooring systems is at maximum distance, having a breaking strength being a predetermined fraction of the breaking strength, which the main loadbearing mooring elements of the mooring are designed for, and/or at least one seabed power cable safety line having the following properties:

being connected to a floating wind turbine from which a seabed power cable exits or enters the floating offshore wind power plant to or from the seabed, being anchored to existing or separate anchor points on the seabed, not interfering with any normal movements of any existing mooring lines, having a restoring force component in a same direction as the seabed power cable, having an effective length longer than what is needed to remain largely unstressed independent of a position of the floating wind turbine when all main loadbearing mooring elements are intact, and having an effective length short enough to restrict possible movements of the floating wind turbine, when one of the main loadbearing mooring elements fails, together with remaining main loadbearing mooring elements, such that the at least one seabed power cable safety line takes mooring loads instead of the power cable.

2. The system according to claim 1, wherein a center-to-center distance between two floating wind turbines connected to the same power cable is at least 500 m.

3. The system according to claim 1, wherein the power cable safety line has a length of at least 200 m.

4. The system according to claim 1, wherein the at least one power cable safety line comprises any combination of the components chain segments, steel wire rope segments, synthetic rope segments, buoys, weight elements and connection elements.

5. The system according to claim 1, wherein the predetermined fraction of the breaking strength of the power cable structural safety line is 35-70% of a minimum required breaking strength of mooring lines of the main mooring system of the floating wind turbines.

6. The system according to claim 1, wherein the at least one power cable safety line is connected to the power cable at one or several intermediate connection points.

* * * * *